(12) United States Patent
Saitou

(10) Patent No.: US 9,590,217 B2
(45) Date of Patent: Mar. 7, 2017

(54) STRUCTURE FOR MOUNTING BATTERY ON VEHICLE

(71) Applicant: Nissan Motor Co., Ltd., Yokohama-shi, Kanagawa (JP)

(72) Inventor: Hiroaki Saitou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/903,643

(22) PCT Filed: Jun. 27, 2014

(86) PCT No.: PCT/JP2014/067102
§ 371 (c)(1),
(2) Date: Jan. 8, 2016

(87) PCT Pub. No.: WO2015/019741
PCT Pub. Date: Feb. 12, 2015

(65) Prior Publication Data
US 2016/0164055 A1    Jun. 9, 2016

(30) Foreign Application Priority Data

Aug. 7, 2013    (JP) .................................. 2013-164329

(51) Int. Cl.
*B60R 16/04*    (2006.01)
*H01M 2/10*    (2006.01)
(Continued)

(52) U.S. Cl.
CPC ............. *H01M 2/1083* (2013.01); *B60K 1/04* (2013.01); *B60R 16/04* (2013.01); *H01M 2/12* (2013.01);
(Continued)

(58) Field of Classification Search
CPC ....... B60R 16/04; H01M 2/1083; H01M 2/12; H01M 2/1005
See application file for complete search history.

(56) References Cited

U.S. PATENT DOCUMENTS 3,093,515 A * 6/1963 Rector .................... H01M 2/10
429/177
4,966,346 A * 10/1990 Karna .................... B60R 16/04
180/68.5
(Continued)

FOREIGN PATENT DOCUMENTS

WO    2010/123091 A1    10/2010

*Primary Examiner* — Hau Phan
(74) *Attorney, Agent, or Firm* — Global IP Counselors, LLP

(57) ABSTRACT

A vehicle battery mounting structure is provided for mounting a battery on a vehicle. The vehicle battery mounting structure has a sling is used which is mounted to move a battery and which is removed after the battery is moved to a position for assembly onto the vehicle body. In this structure for mounting a battery on a vehicle, the battery includes a gas discharge hose as an attached component which is assembled onto the vehicle body after the battery is mounted. The sling is provided with a hose holding opening for holding the gas discharge hose. The hose holding opening includes a hose opening for removing the gas discharge hose being held, the hose opening being set on the worker side.

6 Claims, 5 Drawing Sheets

(51) Int. Cl.
*B60K 1/04* (2006.01)
*H01M 2/12* (2006.01)

(52) U.S. Cl.
CPC ............... *B60K 2001/0416* (2013.01); *B60K 2001/0466* (2013.01); *H01M 2220/20* (2013.01)

(56) References Cited

U.S. PATENT DOCUMENTS

| | | | | |
|---|---|---|---|---|
| 6,499,190 | B2* | 12/2002 | Ruiz Rodriguez | H01M 2/1005 16/423 |
| 8,632,902 | B2* | 1/2014 | Wendorf | H01M 2/1083 429/100 |

* cited by examiner

STRUCTURE FOR MOUNTING BATTERY ON VEHICLE

CROSS-REFERENCE TO RELATED APPLICATIONS

This application is a U.S. National stage application of International Application No. PCT/JP2014/067102, filed Jun. 27, 2014, which claims priority to Japanese Patent Application No. 2013-164329 filed in Japan on Aug. 7, 2013.

BACKGROUND

Field of the Invention

The present invention relates to a structure for mounting a battery on a vehicle that uses a sling which is mounted to move a battery and which is removed after the battery is moved to a position for assembly onto the vehicle body.

Background Information

Conventionally, a structure for mounting a battery on a vehicle which uses a sling is known. Upon mounting a battery on a vehicle, in order to move the battery, a sling is fixed to the upper two ends of a battery module by the bolts. Then, the sling is hooked to a crane, and the battery module is moved by the crane. In addition, the sling is removed from the battery module, then a frame member, a control device, and the like are attached to the battery module (for example, see International Publication No. WO2010/123091, paragraphs 0066-0069).

SUMMARY

However, in a conventional structure for mounting a battery on a vehicle, there are cases in which the work efficiency declines, when attached components that form the battery module are attached to the battery module after being mounted on the vehicle. On the other hand, when a battery module to which these attached components are attached is moved to the vehicle, and the attached components are then attached to the vehicle body, there is the problem that a failure to attach the attached components could occur.

In view of the problems described above, an object of the present invention is to provide a structure for mounting a battery on a vehicle that is capable of preventing a failure to assemble a hose member to a vehicle body during an operation for mounting a battery on a vehicle, while increasing the ease of assembly of the hose member, which is an attached component of the battery.

In order to achieve the object above, the structure for mounting a battery on a vehicle of the present invention uses a sling which is mounted to move a battery and which is removed after the battery is moved to a position for assembly onto the vehicle body. In this structure for mounting a battery on a vehicle, the battery comprises a hose member as an attached component which is attached to the vehicle body after the battery is mounted. The sling is provided with a hose holding portion for holding the hose member. The hose holding portion provides a hose opening on the worker side for removing the hose member being held.

Therefore, the sling is provided with a hose holding portion for holding a hose member, which is an attached component of the battery. The hose holding portion sets a hose opening on the worker side for removing the hose member being held. That is, since a hose opening of the hose holding portion is set on the worker side, pulling out the hose member being held is easy, and the ease of assembly of the hose member to the vehicle body is improved. Additionally, the sling is a part that is removed after mounting the battery on the vehicle; therefore, by providing a hose holding portion to the sling, in the case that the hose member is failed to be assembled to the vehicle body, the hose member is caught when removing the sling, and the worker is able to notice the failure to assemble the hose member. As a result, it is possible to prevent failure to assemble a hose member to a vehicle body during an operation for mounting a battery on a vehicle, while increasing the ease of assembly of the hose member, which is an attached component of the battery.

BRIEF DESCRIPTION OF THE DRAWINGS

Referring now to the attached drawings which form a part of this original disclosure.

DETAILED DESCRIPTION OF THE EMBODIMENTS

Figure 1:
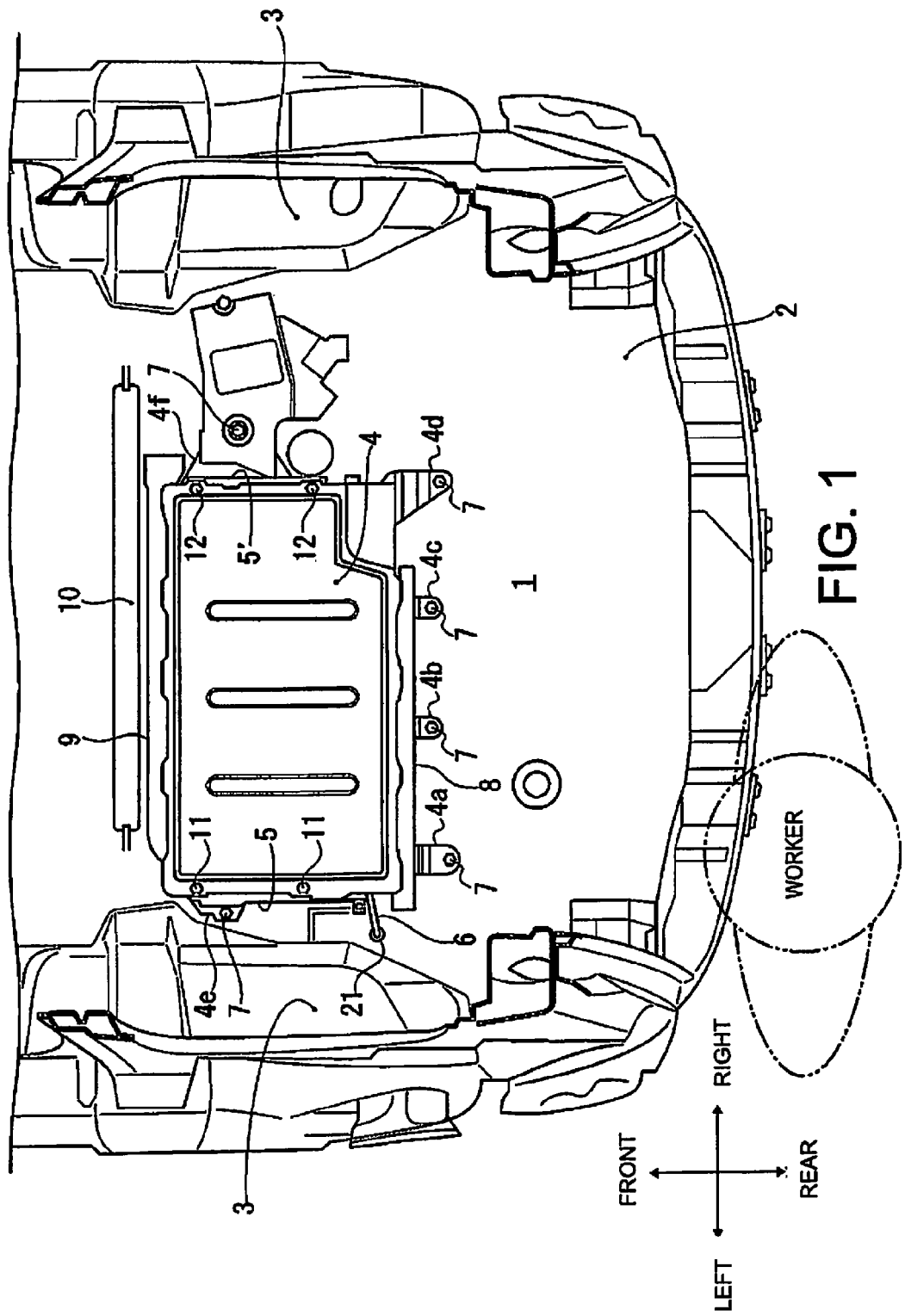
FIG. 1 is a plan view illustrating the structure for mounting a battery on a vehicle of the first embodiment when applied to a hybrid vehicle equipped with a battery at the rear of the vehicle.

Preferred embodiments for realizing a structure for mounting a battery on a vehicle of the present invention is explained below based on the first embodiment illustrated in the drawings.

First Embodiment

The overall configuration of a vehicle battery mounting structure will be described first. The overall configuration of the vehicle battery mounting structure for mounting a battery on a vehicle and the detailed configuration of the vehicle battery mounting structure for mounting a battery on a vehicle will be separately described regarding the configuration of the vehicle battery mounting structure according to the first embodiment.

Overall Configuration of the Vehicle Battery Mounting Structure

FIG. 1 illustrates the structure for mounting a battery on a vehicle of the first embodiment when applied to a hybrid vehicle equipped with a battery at the rear of the vehicle. The overall structure of the structure for mounting a battery on a vehicle is described below, based on FIG. 1.

The structure for mounting a battery on a vehicle comprises a rear room 1, a rear floor panel 2, a pair of rear wheel housings 3 and 3, a battery 4, and a pair of slings 5 and 5', and a gas discharge hose 6 (hose member) as illustrated in FIG. 1.

The rear room 1 is a space at the rear of the vehicle, surrounded by the rear floor panel 2, the left and right rear wheel housings 3 and 3, an unillustrated back door, etc., in which a battery 4 is mounted as well as being used as a luggage room.

The battery 4 is a secondary battery which is mounted as a power source for an unillustrated motor/generator for traveling, and, for example, a lithium ion battery in which a cell module obtained by laminating a large number of cells is set inside a battery pack case is used. This battery 4 is arranged in a flat state in a back left side position when viewing the rear room 1 from the rearward side of the vehicle, and is bolted to the rear floor panel 2, as illustrated in FIG. 1. This bolt fixing structure has four brackets 4a, 4b, 4c, and 4d, which extend from the battery pack lower case to the rearward side of the vehicle and fixed by the bolts 7, and two brackets 4e and 4f, which respectively extend from the battery pack lower case to the left and right directions of the vehicle and fixed by the bolts 7. Then, in the two long side positions in the longitudinal direction of the battery 4 are arranged a pair of battery cooling air ducts 8 and 9 which extend along the respective long sides in the vehicle width direction. A control unit 10 is arranged in an upright state in the vehicle width direction, in a vehicle front side position of the battery 4.

The slings 5 and 5' are temporary fastening members which are temporary mounted to move the battery 4 with a crane or the like, and then removed after the battery 4 is moved to a position for assembly onto a hybrid vehicle. The slings 5 and 5' are fixed to the two short sides of the battery 4 with respect to a vehicle width direction by two bolts 11 and 11 and two bolts 12 and 12 respectively.

The gas discharge hose 6 is a hose for discharging gas inside the battery 4, and one of the hose opening ends is attached beforehand in a state of being inserted into an internal chamber of the battery 4. The other hose opening end is assembled by being inserted into a gas discharge opening 21, which is opened to the rear floor panel 2 (floor panel) located between the battery 4 and the left rear wheel housing 3, and opened to the outside air.

Detailed Configuration of the Vehicle Battery Mounting Structure

FIG. 2 to FIG. 5 illustrate the main components of the structure for mounting a battery on a vehicle of the first embodiment. Detailed configuration of the structure for mounting a battery on a vehicle will be described below, based on FIG. 2 to FIG. 5.

Figure 2:
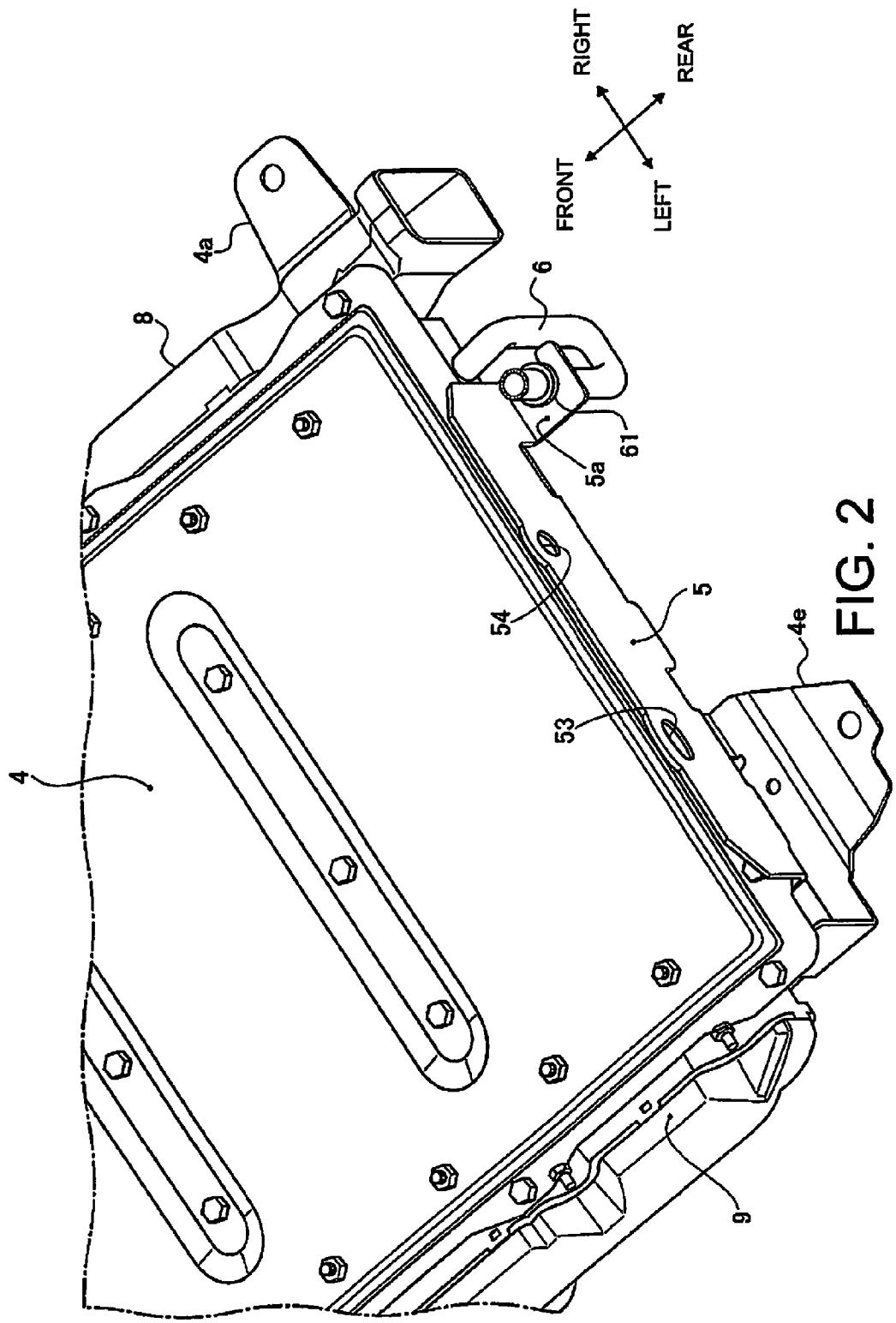
FIG. 2 is a perspective view illustrating a battery before mounting on a vehicle, in which a gas discharge hose is held by the sling of the first embodiment.
Figure 3:
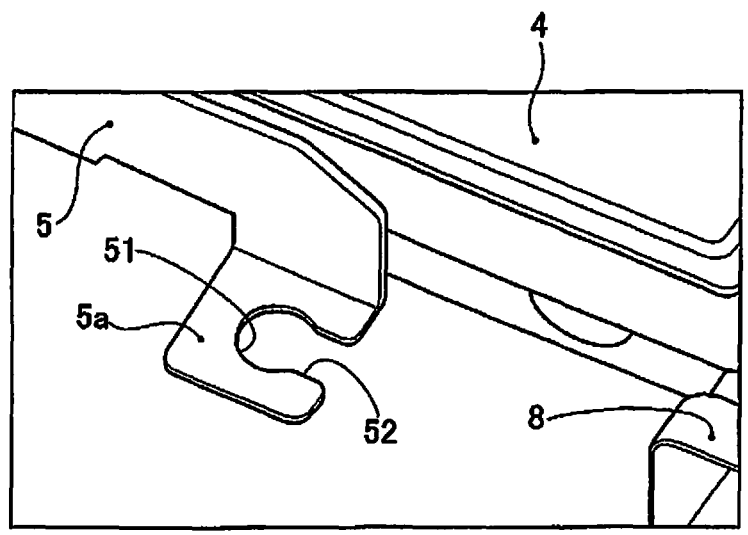
FIG. 3 is an enlarged perspective view illustrating the hose holding portion of the sling, which is bolted to the battery, of the first embodiment.
Figure 3:
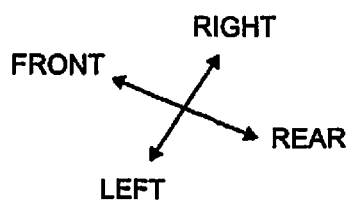

The sling 5 is provided with a hose holding opening 51 (the hose holding portion) for holding the gas discharge hose 6 to an end position on the worker side (=the vehicle rear end position of the sling 5) until the hose is assembled to the vehicle body, as illustrated in FIG. 2. This hose holding opening 51 sets a hose opening 52 on the worker side (=the rearward side of the vehicle) for removing the gas discharge hose 6 being held, as illustrated in FIG. 3 (refer to the worker position in FIG. 1).

Figure 4:
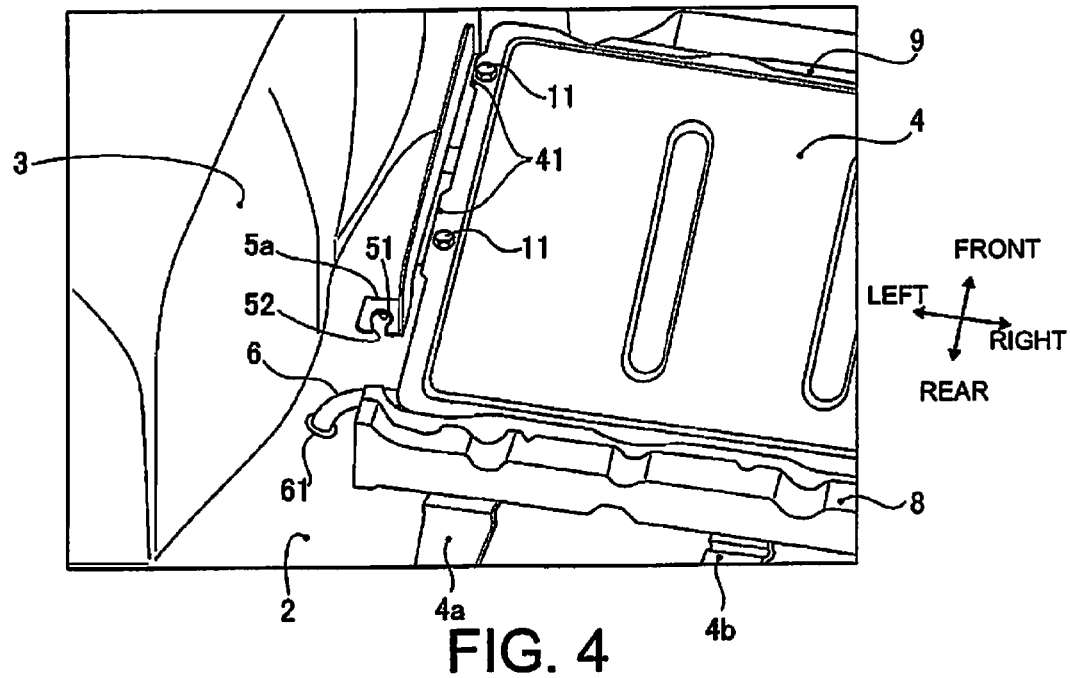
FIG. 4 is a perspective view illustrating a battery after mounting on a vehicle, in which the gas discharge hose of the battery is removed from the sling and assembled to a rear floor panel by insertion.

The sling 5 is a plate member that is fixed to a sling bracket 41 of the battery 4 by the bolts 11, 11 as illustrated in FIG. 4, and has a pair of hook holes 53, 54 to be used when slinging up by a crane as illustrated in FIG. 2. The hose holding opening 51 is an opening in the hose holding plate 5a that is integrally bent and formed from the main body portion of the sling 5 having the hook holes 53, 54, and the hose opening 52 is a slit opening that is formed so as to communicate with the hose holding opening 51, as illustrated in FIG. 3. The slit opening surface of the hose opening 52 is configured to be a smooth curved surface so as to not damage the hose surface when inserting and withdrawing the gas discharge hose 6.

The gas discharge hose 6 is an attached component to be assembled to a hybrid vehicle after mounting the battery 4 on the vehicle. A grooved packing 61 is attached to the end peripheral position of the gas discharge hose 6. The circumferential groove portion of the grooved packing 61 secures the hose holding ability of the sling 5 with respect to the hose holding opening 51, and secures the hose holding ability with respect to the gas discharge opening 21 in a state of being assembled to the rear floor panel 2 by insertion.

Next, the actions are described. The battery assembly work procedure and the hose assembly failure prevention action will be separately described regarding the actions of the structure for mounting a battery on a vehicle of the first embodiment.

Battery Assembly Work Procedure

The assembly work procedure of the battery 4 is carried out by progressing through (a) a sling fixing procedure, (b) a battery moving procedure, (c) a battery fixing procedure, (d) gas discharge hose assembly procedure, and (e) a sling removing procedure. Each procedure is described below. Regarding the battery fixing procedure and the gas discharge hose assembly procedure, the battery fixing procedure may be carried out after the gas discharge hose assembly procedure.

(a) Sling Fixing Procedure

The two slings 5 and 5' and the four bolts 11 and 11, 12 and 12 are prepared per one battery 4. The sling 5 is fixed to the short side position of the battery 4 on the left side in a vehicle mounted state by the two bolts 11 and 11. Similarly, the sling 5' is fixed to the short side position of the battery 4 on the right side in a vehicle mounted state by the two bolts 12 and 12. After bolting the slings 5 and 5', the gas discharge hose 6 is inserted from the hose opening 52 of the sling 5, and the gas discharge hose 6 is held against the hose holding opening 51, as illustrated in FIG. 2.

(b) Battery Moving Procedure

The battery 4 is moved from a battery placing site, where the battery 4, to which the slings 5 and 5' are bolted and the gas discharge hose 6 is held, is placed, to the rear of the vehicle, which is the battery mounting position of the hybrid vehicle. At this time, the hooks on the wire ends are anchored to the hook holes 53 and 54 of the sling 5 and the unillustrated hook holes of the sling 5'. Then, the battery 4 is slung up by the crane while being kept horizontal and moved from the battery placing site to the rear of the vehicle; then the slung battery 4 is lowered to a battery fixing position of the rear floor panel 2, and the anchored hooks are removed.

(c) Battery Fixing Procedure

The battery 4 that has been moved to the battery fixing position of the rear floor panel 2 by the crane is bolted to the rear floor panel 2. This bolt fixing is carried out by fixing the four brackets 4a, 4b, 4c, and 4d, which extend from the battery pack lower case to the rearward side of the vehicle, by the four bolts 7. Then, the brackets 4e and 4f, which respectively extend from the battery pack lower case to the left and right directions of the vehicle, are each fixed by two of the bolts 7.

(d) Gas Discharge Hose Assembly Procedure

Figure 5:
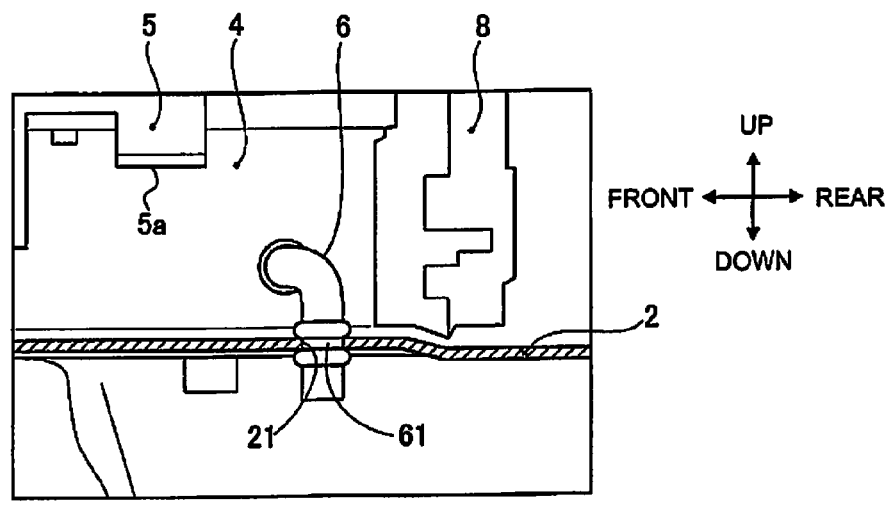
FIG. 5 is a cross-sectional view illustrating the insertion assembly state of the gas discharge hose to the rear floor panel of the first embodiment.

When the battery 4 is fixed, the gas discharge hose 6 being held to the hose holding opening 51 is withdrawn from the hose opening 52, before removing the slings 5 and 5'. Then, the gas discharge hose 6 is assembled by being inserted in a gas discharge opening 21, which is opened to a rear floor panel 2 between the battery 4 and the rear wheel housing 3, as illustrated in FIG. 4 and FIG. 5.

(e) Sling Removing Procedure

After assembling the gas discharge hose 6, one sling 5 is removed from the battery 4 by loosening and pulling out the two bolts 11 and 11. Similarly, the other sling 5' is removed from the battery 4 by loosening and pulling out the two bolts 12 and 12. At this time, the one sling 5 can be easily removed as is, as long as there is no assembly failure of the gas discharge hose 6.

Hose Assembly Failure Prevention Action

Of the assembly work procedure of the battery 4 described above, there are cases in which there is an assembly failure of the gas discharge hose 6, which is present in a position that is difficult for the worker to see. The hose assembly failure prevention action is described below.

For example, one in which a hose holding portion is not provided to the sling shall be a Comparative Example. In the case of this Comparative Example, the gas discharge hose must be inserted into the vehicle body after mounting the battery on the vehicle; however, an insertion failure is often overlooked. Therefore, there is a problem that a checking step by another worker must be set as a subsequent step after the battery 4 assembly step in order to prevent an insertion failure of the hose.

Figure 6:
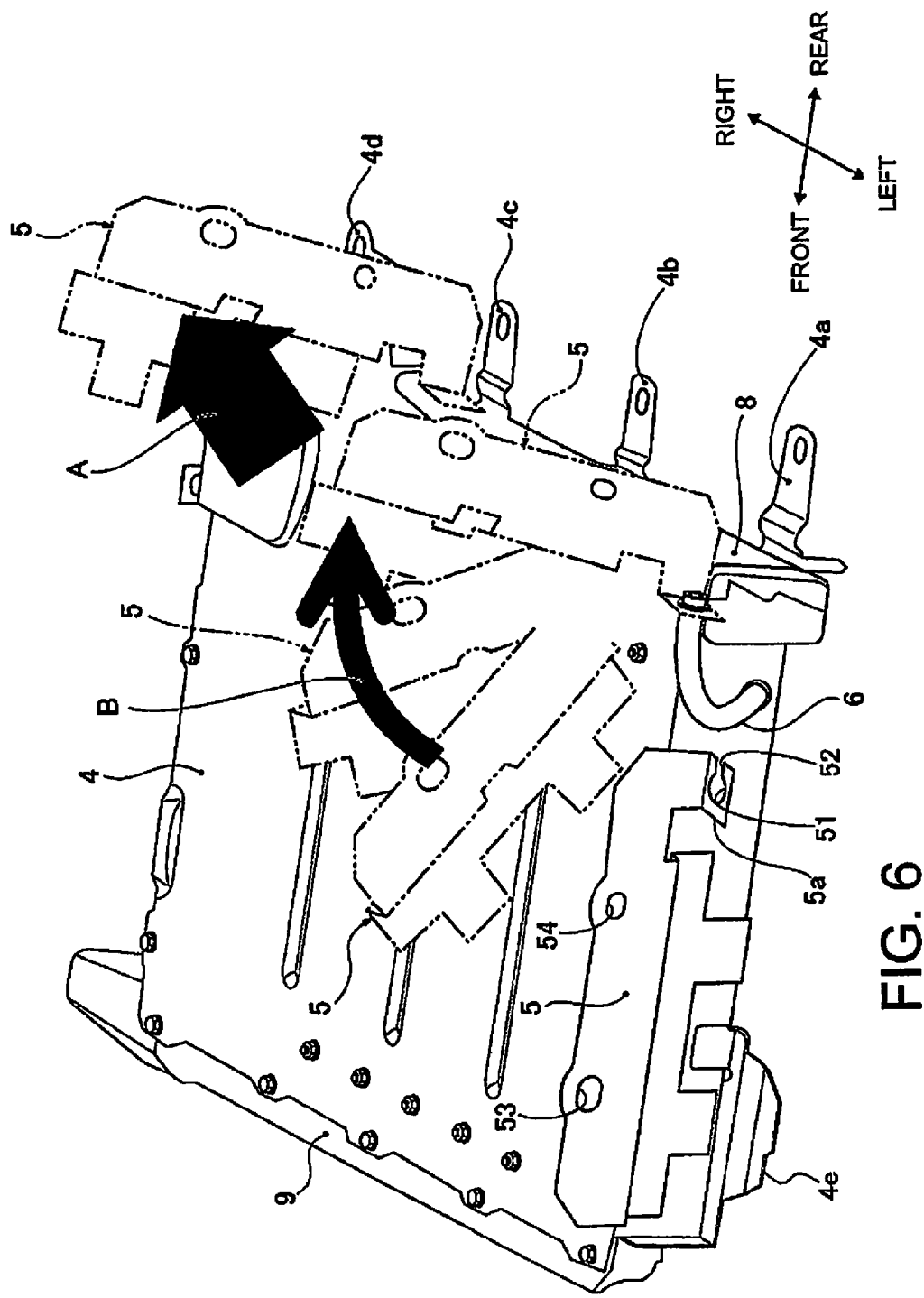
FIG. 6 is an operation explanatory view illustrating a state in which the sling is removed while failing to assemble the gas discharge hose in the structure for mounting a battery on a vehicle of the first embodiment.

In contrast, the sling 5 interferes with other parts unless removed, preventing the vehicle assembly, and thus is a part that cannot be forgotten to be removed; therefore, the inventors paid attention to the fact that the sling is a part that is necessarily removed after mounting the battery on the vehicle. Thus, a configuration was employed in which a hose holding opening 51 for holding the gas discharge hose 6 is provided to the sling 5, and in which a hose opening 52 is set on the worker side for removing the gas discharge hose 6 being held. Therefore, as the sling 5 is a part that is removed after mounting the battery on the vehicle, and by providing a hose holding opening 51 having a hose holding shape to the sling 5, in the case that the gas discharge hose 6 is failed to be inserted, the gas discharge hose 6 is caught when removing the sling 5, and the worker is able to notice the insertion failure of the hose. In addition, since the hose opening 52 of the hose holding opening 51 is opened on the worker side, removing the gas discharge hose 6 is easy, and the ease of assembly of the gas discharge hose 6 to the vehicle is improved. Then, in a state in which the worker lifts up and pulls the sling 5 and the gas discharge hose 6 is tensioned, if the sling 5 is pulled with a greater force, the sling 5 is easily pulled off of the gas discharge hose 6 (the pulling direction of the worker is indicated by the arrow A direction in FIG. 6). Accordingly, the gas discharge hose 6 can be prevented from detaching from the battery 4 and coming out with the sling 5 (=same result as an assembly failure of the hose). Additionally, any damage to the gas discharge hose 6 can also be reduced. Furthermore, in the case of a vehicle in which other parts cannot be assembled unless the sling 5 is removed after mounting the battery on the vehicle, the sling 5 itself will not be forgotten to be removed, and thus the effectiveness is further enhanced.

In the first embodiment, a configuration was employed in which the hose holding opening 51 is provided to an end position on the worker side of the sling 5. In other words, by providing a hose holding opening 51 at the end position on the worker side, the sling is rotated around the hose holding opening 51 as the supporting point (the rotation direction of the sling 5 is indicated by the arrow B direction in FIG. 6). Accordingly, since the gas discharge hose 6 is more easily detached from the sling 5, the gas discharge hose 6 can be prevented from detaching from the battery 4 and following the sling 5 (=same result as an assembly failure of the hose).

Next, the effects are described. The effects listed below can be obtained with the structure for mounting a battery on a vehicle according to the first embodiment.

(1) In a structure for mounting a battery on a vehicle that uses the sling 5 which is mounted to move the battery 4 and which is removed after the battery 4 is moved to a position for assembly onto a vehicle body. The battery 4 comprises a hose member (the gas discharge hose 6) as an attached component which is assembled onto the vehicle body after the battery 4 is mounted on the vehicle. The sling 5 is provided with a hose holding portion (the hose holding opening 51) for holding the hose member (the gas discharge hose 6). The hose holding portion (the hose holding opening 51) sets a hose opening 52 on the worker side for removing the hose member (the gas discharge hose 6) being held (FIG. 1). Accordingly, it is possible to prevent the failure to assemble a hose member (the gas discharge hose 6) to a vehicle body during an operation for mounting a battery on a vehicle, while increasing the ease of assembly of the hose member (the gas discharge hose 6), which is an attached component of the battery 4.

(2) The hose holding portion (the hose holding opening 51) is provided to an end position on the worker side of the sling 5 (FIG. 2). Accordingly, in addition to the effect of (1), the hose member (the gas discharge hose 6) is more easily detached from the sling 5, and the hose member (the gas discharge hose 6) can be prevented from detaching from the battery 4 and following the sling 5.

(3) The sling 5 is a plate member that is bolted to a sling bracket 41 of the battery 4. The hose holding portion is a hose holding opening 51 which is opened to a hose holding plate 5a that is integrally bent and formed from the sling 5, and the hose opening 52 is a slit opening formed on the hose holding plate 5a communicating with the hose holding opening 51 (FIG. 3). Accordingly, in addition to the effects of (1) or (2), the hose holding opening 51 and the hose opening 52 can be easily provided to a sling 5 made of a plate member that is bent machined or punched by press molding, without increasing the number of parts.

(4) The hose member is a gas discharge hose 6 that is assembled by being pulled out from the hose opening 52 and inserted into a gas discharge opening 21, which is opened to a floor panel (the rear floor panel 2) between the battery 4 and the wheel housing (the rear wheel housing 3) (FIG. 4). Accordingly, in addition to the effects of (1) to (3), an assembly failure of the gas discharge hose 6, which is present in a position that is difficult to see by the worker, can be prevented.

The structure for mounting a battery on a vehicle of the present invention was described above based on the first embodiment, but specific configurations thereof are not limited to the first embodiment, and various modifications and additions to the design can be made without departing from the scope of the invention according to each claim in the Claims.

In the first embodiment, an example was shown in which a worker mounts the battery 4 and the gas discharge hose 6 from the back door side on the rearward side of the vehicle. However, the battery and the hose member may be, for example, mounted from the rear seat side, mounted by a worker from the side door side in the vehicle width direction, or mounted by a worker from the frontward side of the vehicle.

In the first embodiment, an example was shown in which the hose holding opening 51 provided integrally with the sling 5 is used as the hose holding portion. However, various structures other than a hose holding opening may be used as the hose holding portion, as long as the configuration makes holding the hose member possible. Additionally, the hose holding portion may be configured separately from the sling, and be integrally coupled to the sling by retrofitting.

In the first embodiment, an example was shown in which the gas discharge hose 6 is used as the hose member. However, other than a gas discharge hose, the hose member may be a hose-like member that is attached to the battery, such as a condensed water discharge hose or a harness member.

In the first embodiment, an example was shown in which the structure for mounting a battery on a vehicle of the present invention is applied to the battery 4 that is mounted on the rear of the vehicle that is a hybrid vehicle. However, the structure for mounting a battery on a vehicle of the present invention may be applied to a battery that is mounted to various positions, such as the front of the vehicle. Furthermore, the invention may also be applied to a battery that is mounted on an electric vehicle or an engine vehicle.

The invention claimed is:

1. A vehicle battery mounting structure for mounting a battery on a vehicle in which the battery comprises a hose member as an attached component which is assembled onto a vehicle body after the battery is mounted on the vehicle, the vehicle battery mounting structure comprising:
    a sling configured to be mounted to the battery, the sling including a hose holding portion configured to hold the hose member of the battery while the battery is attached to the sling such that the hose member is arranged in a position to be assembled onto the vehicle body after the battery is mounted on the vehicle,
    the hose holding portion including a hose opening that is arranged in a direction in which a user pulls out the hose member from the hose holding portion for removing the hose member being held,
    the hose holding portion being provided to an end position of the sling in which the hose member is detached from the sling when removing the sling from the battery,
    the sling being a plate member having a main body portion that is configured to be bolted to a sling bracket of the battery,
    the hose holding portion being a hose holding opening in a hose holding plate that is integrally bent and formed from the main body portion of the sling, and
    the hose opening being a slit opening formed in the hose holding plate communicating with the hose holding opening.

2. The vehicle battery mounting structure according to claim 1, wherein
    the hose member is a gas discharge hose that is assembled by being pulled out from the hose opening and inserted to a gas discharge opening, which is opened to a floor panel between the battery and a wheel housing.

3. A battery mounting method for mounting a battery on a vehicle in which the battery comprises a hose member which is assembled onto a vehicle body after the battery is mounted on the vehicle, the battery mounting method comprising:
    fixing a sling to the battery, the sling including a hose holding portion and a hose opening, and the sling being fixed to the battery such that the hose member of the battery is held against the hose holding portion of the sling,
    moving the battery to which the sling is fixed to a battery mounting position toward a rear of the vehicle,
    fixing the battery to which the sling is fixed to the vehicle,
    withdrawing the hose member from the hose opening, and
    removing the sling from the battery after the hose member has been withdrawn from the hose opening.

4. The battery mounting method according to claim 3, wherein the hose holding portion is provided to an end position of the sling in which the hose member is detached from the sling when removing the sling from the battery.

5. The battery mounting method according to claim 3, wherein
    the sling is a plate member having a main body portion that is configured to be bolted to a sling bracket of the battery,
    the hose holding portion is a hose holding opening in a hose holding plate that is integrally bent and formed from the main body portion of the sling, and
    the hose opening is a slit opening formed in the hose holding plate communicating with the hose holding opening.

6. The battery mounting method according to claim 3, wherein the hose member is a gas discharge hose that is assembled by being pulled out from the hose opening and inserted to a gas discharge opening, which is opened to a floor panel between the battery and a wheel housing.

* * * * *